United States Patent [19]
Itoh et al.

[11] Patent Number: 5,243,587
[45] Date of Patent: Sep. 7, 1993

[54] DISC PLAYING APPARATUS CAPABLE OF BOTH LONG TIME REPRODUCTION AND HIGH SPEED ACCESS

[75] Inventors: Naoto Itoh; Yoshihisa Nagai; Minemasa Ohta, all of Koufu, Japan

[73] Assignees: Pioneer Video Corporation, Yamanashi; Pioneer Electronic Corp., Tokyo, both of Japan

[21] Appl. No.: 916,703

[22] Filed: Jul. 22, 1992

[30] Foreign Application Priority Data

Feb. 3, 1992 [JP] Japan .................... 4-17874

[51] Int. Cl.[5] .............................. G11B 7/00
[52] U.S. Cl. .................... 369/48; 369/50; 369/53; 369/54; 369/124
[58] Field of Search ............ 360/27, 32, 36.2, 51–52; 369/44.34, 47–48, 50, 53, 54, 124

[56] References Cited

U.S. PATENT DOCUMENTS

| | | | |
|---|---|---|---|
| 4,507,767 | 3/1985 | Takasugi | 369/54 |
| 4,554,652 | 11/1985 | Maeda et al. | 369/54 X |
| 4,669,072 | 5/1987 | Miura et al. | 369/54 X |

Primary Examiner—W. R. Young
Attorney, Agent, or Firm—Sughrue, Mion, Zinn, Macpeak & Seas

[57] ABSTRACT

A disc playing apparatus which can access to a desired track at a high speed without losing an advantage of a large recording capacity of a non-CAV disc. A disc 1 on which a predetermined information signal is recorded is rotated at a constant rotational speed, the information signal is read out to thereby obtain a read signal, a reproduction clock signal $CLK_1$ is extracted from the read signal, and the read signal is demodulated to thereby obtain demodulation data. A clock signal $CLK_2$ of a predetermined frequency is generated, the demodulation data is stored in response to the reproduction clock signal $CLK_1$, the stored demodulation data is sequentially read out in accordance with the storing order in response to the clock signal $CLK_2$, and when it is detected that a residual data amount exceeds a predetermined amount, a read stop signal is generated, thereby stopping the reading operation of the information signal in response to the read stop signal.

2 Claims, 2 Drawing Sheets

DISC PLAYING APPARATUS CAPABLE OF BOTH LONG TIME REPRODUCTION AND HIGH SPEED ACCESS

BACKGROUND OF THE INVENTION

1. Field of the Invention

The present invention relates to a disc reproducing apparatus for reading information from an information recording disc.

2. Description of Background Information

ROM-type optical discs on which digital information has been recorded are generally classified into CLV (Constant Linear Velocity) discs and CAV (Constant Angular Velocity) discs, as two important disc types.

The CLV disc is advantageous from a viewpoint of a recording capacity because information is recorded at a uniform recording density irrespective of a radial position of the track. The CLV disc, however, requires that the disc must be rotated at a constant linear velocity. In the conventional CLV disc playing apparatus, therefore, a rotational speed of the disc is changed in accordance with the position of a pickup in the disc radial direction. This requires a rotation driving system having a complicated construction. Moreover, when accessing to a desired track, it takes a time period until a rotation servo is stabilized.

On the other hand, in case of a CAV disc, since information has been recorded on the disc at a constant rotational angular velocity, it is sufficient to control a rotation driving system of the disc at a constant rotational speed. The necessary construction is simple and it is possible to access to a desired track at high speed. A recording density, however, changes in accordance with the track radial position, namely, the recording density of tracks near the outer periphery is lower than that of tracks near the inner periphery, so that a recording capacity is smaller than that of the CLV disc.

The recording medium such as an ROM type optical disc is recently used to record or reproduce various kinds of information such as data, program, and the like as well as video images and audio data. An importance is paid to both of the high accessing speed and the long time reproduction (realization of a large capacity of recording information).

OBJECTS AND SUMMARY OF THE INVENTION

The invention has been devised in consideration of the above points and it is an object of the invention to provide a disc playing apparatus which can access to a desired track at a high speed without losing an advantage of a large recording capacity of non-CAV discs including the CLV disc.

A disc playing apparatus according to the invention comprises: rotation driving means for rotating, at a constant rotational speed, a disc on which an information signal of a predetermined format including clock information has been recorded; reading means for reading out the information signal from the disc and obtaining a read signal; extracting means for extracting a reproduction clock signal from the read signal; demodulating means for demodulating the read signal and obtaining demodulation data; clock generating means for generating a clock signal of a predetermined frequency; memory means into which the demodulation data is stored in response to the reproduction clock signal and from which the stored demodulation data is read out for output in accordance with the storing order in response to the clock signal of the predetermined frequency; and detecting means for detecting that a residual data amount in the memory means exceeds a predetermined amount and generating a read stop signal, wherein the reading means stops the reading operation of the information signal in response to the read stop signal.

According to the disc playing apparatus of the invention, the recording information on the disc is read out and demodulated to thereby obtain the demodulation data, the demodulation data is stored into the memory means in response to the reproduction clock signal, the stored demodulation data is sequentially read out from the memory means in accordance with the storing order in response to the clock signal of the predetermined frequency, and when a residual data amount in the memory means exceeds the predetermined amount, the reading operation of the recording information is stopped.

DETAILED DESCRIPTION OF THE EMBODIMENT

An embodiment of the invention will be described in detail hereinafter with reference to the drawings.

Figure 1:
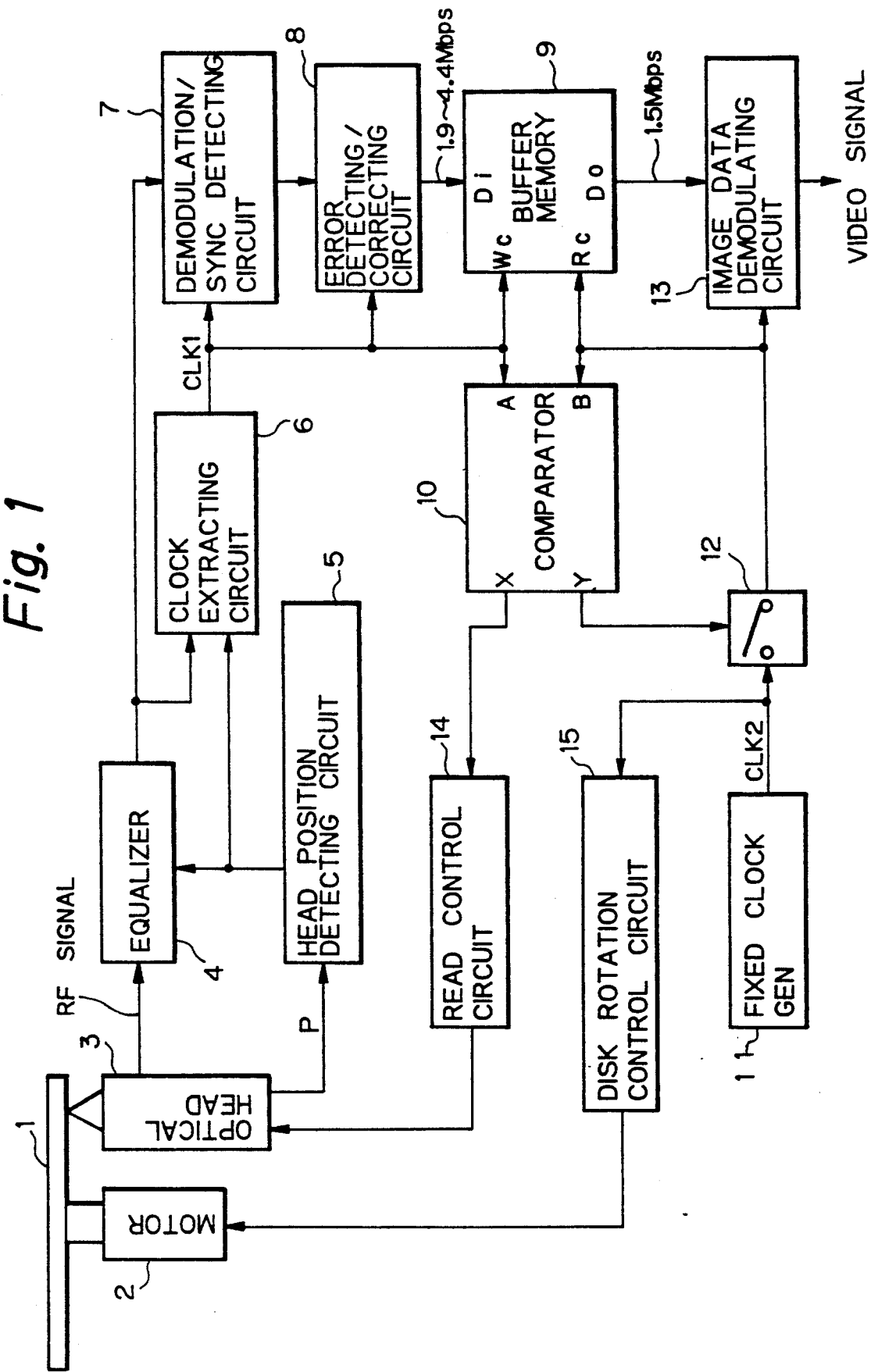
FIG. 1 is a block diagram showing a disc playing apparatus according to an embodiment of the invention.

FIG. 1 is a block diagram showing a disc reproducing apparatus of the embodiment according to the invention.

In the diagram, a disc 1 is an ROM type optical disc having a diameter of 120 mm on which video data that has been high-efficient encoded by an MPEG (Moving Picture Coding Experts Group) system has been recorded in a CLV mode in which, for instance, a linear velocity is set to 1.25 m/sec and a recording track diameter is set to a value within a range from 25 to 58 mm and a recording data rate is set to 1.5 Maps. When the disc 1 is read out in the normal CLV mode, a rotational speed is equal to 478 r.p.m. at the position of the track radius of 25 mm and is equal to 206 r.p.m. at the position of the track radius of 58 mm and the video data is reproduced at the same data rate of 1.5 Mbps.

The CLV disc 1 is rotated at a constant rotational speed such as 600 r.p.m. by a motor 2 and a disc rotation control circuit 15, which will be explained hereinafter. A light beam from an optical head 3 is irradiated to a recording surface and is reflected in accordance with the recording information. The optical head 3 detects the reflected light and performs photoelectric conversion, to obtain an RF (high frequency) signal as a read signal corresponding to the recording information on the disc and supplies it to an equalizer 4. When the optical head 3 moves in the radial direction of the disc, the head 3 generates a pulse signal P according to a movement amount and supplies to a head position detecting circuit 5.

The detecting circuit 5 detects a reading position of the optical head 3 for the disc 1 by counting the pulse signals P and supplies read position signal corresponding to the reading position to the equalizer 4 and a clock extracting circuit 6.

The equalizer 4 equalizes a waveform of the input RF signal while changing a time constant in accordance with the read position signal from the head position detecting circuit 5. This is because when the CLV disc is reproduced at a CAV, an MTF (Modulation Transfer Function) of the reproduction signal changes depending on the track radial position which is being accessed. The waveform equalized signal is supplied as read data to the clock extracting circuit 6 and a demodulation/synchronism detecting circuit 7.

The clock extracting circuit 6 changes the frequency of the reproduction clock signal which is extracted from the output data of the equalizer 4 in accordance with the read position signal from the head position detecting circuit 5. This is because when the CLV disc is reproduced at a CAV, the frequency of the reproduction clock signal differs depending on the track radial position which is being accessed. The reproduction clock signal is supplied as a clock signal $CLK_1$ to the demodulation/synchronism detecting circuit 7 and an error detecting/correcting circuit 8 and is also supplied to a write clock input terminal $W_C$ of a buffer memory 9 and a comparison input terminal A of a comparator 10.

The output read data from the equalizer 4 is demodulated in the circuits 7 and 8 by using the clock signal $CLK_1$ and is subjected to predetermined data processes. After that, the processed signal is supplied to a data input terminal $D_i$ of the buffer memory 9. The buffer memory 9 comprises, for instance, an FIFO (First-in First-out) type semiconductor memory and sequentially stores the output data of the error detecting/correcting circuit 8 in response to the clock signal $CLK_1$. In this instance, a data rate at which data is written into the buffer memory 9 changes in accordance with the track radial position which is being accessed and is set to 1.9 Mbps at the position of a radius of 25 mm and is set to 4.4 Mbps at the position of a radius of 58 mm.

A fixed clock generator 11 generates a clock signal $CLK_2$ of a predetermined frequency f and supplies through a switching circuit 12 to a read clock input terminal $R_C$ of the buffer memory 9, a compared input terminal B of the comparator 10, and an image data demodulating circuit 13. The data which has already been written in the buffer memory 9 by the clock signal $CLK_1$ is read out from the buffer memory 9 in accordance with the data writing order in response to the clock signal $CLK_2$ obtained through the switching circuit 12 and is supplied to the image data demodulating circuit 13. In this instance, a data rate at which data is read out from the buffer memory 9 is set to a fixed value of 1.5 Mbps irrespective of the track radial position which is being accessed. The demodulating circuit 13 supplies the demodulation data to a video signal processing system (not shown) at the next stage on the basis of the clock signal $CLK_2$.

The comparator 10 is provided to detect the number of data which are not yet read out from the buffer memory 9, that is, a residual data amount in the buffer memory 9 and comprises two counters: that is, a first counter which receives the clock signal $CLK_1$ as a clock input; and a second counter which receives the clock signal $CLK_2$ as a lock input. The comparator 10 compares a count output $C_1$ of the first counter and a count output $C_2$ of the second counter and generates signals indicative of the results of the comparison from output terminals X and Y.

A read control circuit 14 generates a read stop signal in response to the signal from the output terminal X of the comparator 10 and temporarily stops the reading operation of the recording information by the optical head 3. The switching circuit 12 is closed in response to the signal from the output terminal Y of the comparator 10. The disc rotation control circuit 15 always rotates the spindle motor 2 at a constant rotational speed by using the clock signal $CLK_2$ from the fixed clock generator 11.

For instance, the optical head 3 includes a quadrant type photodetector and obtains an information read signal and a tracking error signal by combining outputs from the photodetectors. In the reading stop operation of the optical head 3, only the generation of the information read signal is stopped and the tracking error signal is continuously supplied to a tracking servo system (not shown).

The operation of the above construction will now be described with reference to FIG. 2.

Figure 2:
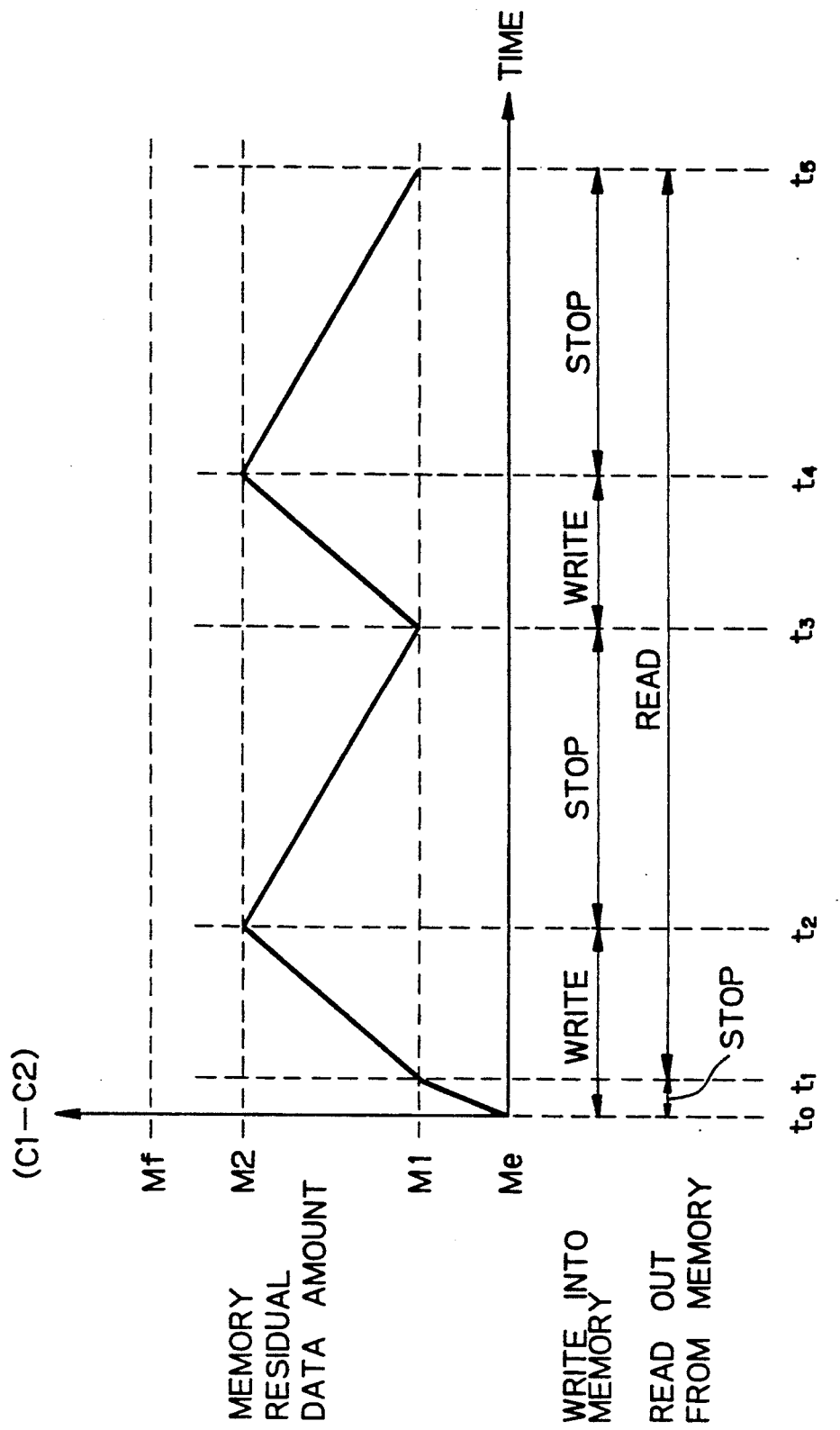
FIG. 2 is a diagram for explaining the operation of the disc playing apparatus of FIG. 1.

FIG. 2 shows what is called a residual data amount during the reproducing operation of the disc reproducing apparatus, in which the residual data amount is obtained by subtracting a read data amount from a write data amount in the buffer memory 9.

At time $t_0$, when the reproducing operation is started in a system reset state, the recording information on the CLV disc 1 is read out by the optical head 3. In this instance, the head position detecting circuit 5 supplies the read position signal to the equalizer 4 and clock extracting circuit 6 by the pulse signal P from the optical head 3. The waveform equalization of the read signal according to the reading position and the clock extraction are executed by the equalizer 4 and the clock extracting circuit 6. In the demodulation/synchronism detecting circuit 7 and the error detecting/correcting circuit 8, predetermined signal processes are executed to the output read data from the equalizer 4 on the basis of the reproduction clock signal $CLK_1$ according to the reading position. The clock signal $CLK_1$ is supplied as a write clock to the buffer memory 9 in response to the clock signal $CLK_1$ in accordance with the reading order of the recording information.

On the other hand, in the comparator 10, the number of clock pulses of the clock signal $CLK_1$, namely, the number of writing times of the data into the buffer memory 9 is compared with the number of clock pulses of the clock signal $CLK_2$, that is, the number of reading times of the data from the buffer memory 9. When a difference ($C_1-C_2$) between the count output $C_1$ of the first counter and the count output $C_2$ of the second counter, that is, the residual data amount in the buffer memory 9 satisfies the following relation (1), $$(C_1-C_2) > M_1 \qquad (1)$$

the comparator 10 generates a high level signal from the output terminal Y as a result of the comparison. $M_1$ denotes a first predetermined residual data amount. Since both of the first and second counters are in the reset state at time $t_0$, $C_1=0$ and $C_2=0$, so that a low level signal is generated from the output terminal Y. The switching circuit 12, consequently, is opened and the clock signal $CLK_2$ from the fixed clock generator 11 is not supplied, so that no data is read out from the buffer memory 9. Only the writing operation of the data into the buffer memory 9 is executed for a little while after time $t_0$. In the buffer memory 9, accordingly, the residual data amount gradually increases from the empty state of the residual data amount at time $t_0$.

When the above relation (1) is satisfied at time $t_1$ and the data of the first predetermined residual data amount $M_1$ is written into the buffer memory 9, the comparator 10 generates a high level signal as a read start signal for the memory from the output terminal Y, thereby closing the switching circuit 12. The clock signal $CLK_2$ from the fixed clock generator 11 is, consequently, supplied through the switching circuit 12 to the buffer memory 9, comparator 10, and image data demodulating circuit 13. The stored data is sequentially read out from the buffer memory 9 in response to the clock signal $CLK_2$ in accordance with the writing order of the data. The read-out data is converted into the video signal by the image data demodulating circuit 13 and, after that, it is supplied to a video signal processing system at the post stage. A read data rate in this instance is set to 1.5 Mbps in a manner similar to the case of the reproduction in the ordinary CLV mode. Even when the reading operation of the data from the buffer memory 9 is started at time $t_1$, the writing operation of the data from time $t_0$ is continued. Since the write data rate is higher than the read data rate, the residual data amount in the buffer memory 9 continuously increases.

When the residual data amount $(C_1 - C_2)$ satisfies the following relation (2) at time $t_2$, $$(C_l - C_2) > M_2 \quad (2)$$

the comparator 10 generates a high level signal from the output terminal X as a result of the comparison. $M_2$ denotes a second predetermined residual data amount. The read control circuit 14 generates a control signal in accordance with the high level signal from the comparator 10, thereby temporarily stopping the reading operation of the recording information by the optical head 3. The generation of the read data from the equalizer 4 is stopped in association with the stop of the reading operation, so that no reproduction clock signal $CLK_1$ is also generated from the clock extracting circuit 6 and the writing operation of the data into the buffer memory 9 is also interrupted. The reading operation of the data from the buffer memory 9 continues after time $t_1$, so that the residual data amount in the buffer memory 9 starts decreasing.

When the residual data amount $(C_1 - C_2)$ satisfies the following relation (3) at time $t_3$, $$(C_l - C_2) < M_1 \quad (3)$$

the comparator 10 generates a low level signal from the output terminal X. The read control circuit 14 generates a read permission signal in response to the low level signal and controls the optical head 3 so as to restart the reading operation of the recording information. The same state as that at time $t_1$ is, therefore, obtained and the operations similar to those for a time interval from time $t_1$ to time $t_3$ are repeated after that until the completion of the reproducing operation.

In the embodiment as mentioned above, although the read data rate by the optical head changes, by devising the read/write control of the buffer memory, the data at a predetermined rate can be supplied to the video signal processing system as if the data has been reproduced in the CLV mode. In the disc rotation control system, it is sufficient to rotate the CLV disc at a CAV so as to always apply a servo lock to a certain reference signal such as a clock signal $CLK_2$. Even when the optical head is moved to any position on the track radius by a desired access, therefore, it is unnecessary to perform the rotation control according to the track radial position. A rotation waiting time which is peculiar in the reproduction of the CLV disc doesn't occur. Since the rotational speed is constant, further, the rotation control system is simplified and the rotating precision can be also easily raised.

The same high accessing speed as that in case of a CAV disc can, consequently, be assured while reproducing a CLV disc of a large recording capacity. Since the embodiment can be also obviously applied to a CAV disc, a disc reproducing apparatus having a common simple rotation control system can be realized irrespective of the kind of CLV/CAV of the disc or the like.

In the above embodiment, the first and second predetermined residual data amounts $M_l$ and $M_2$ are set so as to satisfy the following relation $(M_e \leq M_1 < M_2 \leq M_f)$ on the assumption that the residual data amount is set to $M_e$ when it is equal to 0 and that the residual data amount is set to $M_f$ when it is equal to the memory capacity, namely, when the memory is filled with the stored data which is not read out. It is also obviously possible to set such that $M_1 = M_e$ and $M_2 = M_f$. Although the above embodiment has been described with respect to only the reproduction of the ROM type CLV disc, the invention is not limited to the ROM type but can be also applied to a writable type disc. The invention is not limited to the CLV disc but can be also generally applied to a non-CAV disc such as MCLV (Modified CLV) in which a rotational speed changes step by step, MCAV (Modified CAV), or the like.

As described above, according to the disc playing apparatus of the invention, the recording information of the disc is read out and demodulated to thereby obtain the demodulation data, the demodulation data is stored into the memory means in response to the reproduction clock signal, and the stored demodulation data is sequentially read out from the memory means in accordance with the storing order in response to the clock signal of a predetermined frequency, and when the residual data amount in the memory means exceeds a predetermined amount, the reading operation of the recording information is stopped. It is, therefore, possible to access to a desired track at a high speed without losing the advantage of the large recording capacity of the non-CAV disc.

What is claimed is:

1. A disc playing apparatus comprising:
    rotation driving means for rotating, at a constant rotational speed, a disc on which an information signal of a predetermined format including clock information has been recorded;
    reading means for reading said information signal from said disc and obtaining a read signal;
    extracting means for extracting a reproduction clock signal from said read signal;
    demodulating means for demodulating the read signal and obtaining demodulation data;
    clock generating means for generating a clock signal of a predetermined frequency;
    memory means into which said demodulation data is stored in response to said reproduction clock signal and from which said stored demodulation data is sequentially read out for output in accordance with the storing order in response to said clock signal of said predetermined frequency; and detecting means for detecting that a residual data amount in said memory means exceeds a predetermined amount and generating a read stop signal, wherein said reading means stops the reading operation of the information signal in response to said read stop signal.

2. An apparatus according to claim 1, wherein said detecting means detects that the residual data amount in said memory means exceeds a second predetermined amount and generates a read start signal, and said clock generating means starts the generation of said clock signal of said predetermined frequency in response to said read start signal.

* * * * *